United States Patent [19]

Le Sergent

[11] Patent Number: 5,194,714

[45] Date of Patent: Mar. 16, 1993

[54] METHOD AND DEVICE FOR OUTSIDE PLASMA DEPOSITION OF HYDROXYL ION-FREE SILICA

[75] Inventor: Christian Le Sergent, Marcoussis, France

[73] Assignee: Compagnie Generale D'Electricite, Paris Cedex, France

[21] Appl. No.: 533,557

[22] Filed: Jun. 5, 1990

[30] Foreign Application Priority Data

Jun. 5, 1989 [FR] France .................. 89 07391

[51] Int. Cl.⁵ .............................. B23K 9/00
[52] U.S. Cl. .................. 219/121.360; 219/121.47; 219/121.43; 427/446; 55/267; 65/3.12
[58] Field of Search ........... 219/121.47, 76.16, 121.43, 219/121.4, 121.36; 427/34; 55/267, 323; 156/345; 204/298.37; 65/3.12

[56] References Cited

U.S. PATENT DOCUMENTS

| | | |
|---|---|---|
| 4,162,908 | 7/1979 | Rau et al. . |
| 4,441,788 | 4/1984 | Guerder et al. . |
| 4,583,997 | 4/1986 | Staudigl . |
| 4,740,226 | 4/1988 | Toda . |
| 4,793,832 | 12/1988 | Veltman et al. ............ 55/267 |
| 4,881,953 | 11/1989 | Prasad et al. ............ 55/267 |
| 4,957,516 | 9/1990 | Daniels ...................... 55/267 |

FOREIGN PATENT DOCUMENTS

| | | |
|---|---|---|
| 3404119 | 8/1985 | Fed. Rep. of Germany . |
| 3420790 | 12/1985 | Fed. Rep. of Germany . |
| 6097522 | 8/1981 | Japan ...................... 55/267 |
| 1-236920 | 9/1989 | Japan ...................... 55/267 |

Primary Examiner—Mark H. Paschall
Attorney, Agent, or Firm—Sughrue, Mion, Zinn, Macpeak & Seas

[57] ABSTRACT

Method of outside plasma deposition onto a rod (17,22) of silica substantially free from hydroxyl ions, possibly doped to change its refractive index, by reaction with oxygen of a silicon compound and possibly of doping compounds, in the presence of a gas plasma raised to a very high temperature (16) by induction with the help of a high frequency generator (15). The rod on which the silica deposit is made is kept in a sealed chamber (19) separated from the surrounding atmosphere and supplied by a pipe (20) with atmospheric air that is successively passed through a filter (31), a compressor (32) a cooling means (33), a condensation water drain (35) and a final desiccation by adsorption (36, 38). A device for implementing the method is also claimed.

9 Claims, 3 Drawing Sheets

METHOD AND DEVICE FOR OUTSIDE PLASMA DEPOSITION OF HYDROXYL ION-FREE SILICA

BACKGROUND AND FIELD OF THE INVENTION

This invention concerns a method of outside deposition by substantially hydroxyl ion-free plasma, onto a silica rod, possibly doped to modify its refractive index, by reacting a silicon compound, such as $SiCl_4$ for example, as well as any desired dopants, with oxygen in the presence of a plasma created by induction with the help of a high frequency generator. It also concerns a device for implementing the method.

The inventive method and device serve in particular to fabricate preforms intended to be subsequently transformed by drawing into optical fibers for telecommunications cables It is known that the linear attenuation coefficient of such optical fibers is closely related to the hydroxyl ion content of the silica from which they are made, such ions causing a certain absorption of the radiation in the wavelength ranges of the radiation habitually transmitted by the fibers, and at 1.4 micron in particular.

DESCRIPTION OF THE PRIOR ART

The presence of hydroxyl ions can be avoided to a very large extent in a layer of silica deposited on the inside of a tube that is rotated and heated on the outside by a torch moving in translation along the tube, due to the fact that it is possible to control the perfect dryness of the gaseous reagents introduced into the tube to direct the silica deposit onto the tube's inside wall. This control is lost when one wishes to deposit the silica onto the outside surface of a mandrel, heated by the impingement on its surface of a gas plasma at very high temperature simultaneously with the arrival of reagent gases designed to create the silica to be deposited.

This type of deposition can be made either on the entire outside surface of the mandrel, the latter being rotated about its axis and moved in translation relative to the arrivals of plasma and of reagent gases. It can also be made on the end of the mandrel, the gas plasma and the reagents injection being in this case directed to this end of the mandrel, in general to obtain a rod of pure silica. However, in both cases, the presence of moisture near the mandrel, and consequently the presence of hydroxyl ions in the silica deposited on the mandrel, cannot be avoided, the minimum hydroxyl ion concentrations int eh silica so obtained being in practice never less than a few tens of parts per million.

SUMMARY OF THE INVENTION

It is the object of the present invention to manufacture rods comprising an external layer of silica substantially free of hydroxyl ions, or silica rods substantially free of these ions, which can subsequently be used to make optical fibers with a very low linear attenuation coefficient.

The method according to the invention consists in maintaining the rod onto which the deposition of silica is made in a sealed enclosure separated from the surrounding atmosphere and supplied with atmospheric air which is successively subjected to filtering, to compression and cooling, to draining of the condensation water and to a final desiccation by adsorption.

The invention accordingly provides an apparatus, comprising a rod for receiving the silica deposit, a rig imparting rotation and translation to the rod, a torch delivering the plasmagene gas, an induction coil supplied by a high frequency generator around the end of the torch and a nozzle to inject towards the rod a mixture of oxygen and of a silicon compound, and possibly of doping compounds, wherein all of these elements are arranged inside a sealed enclosure separated from the surrounding atmosphere and supplied with atmospheric air by piping means equipped with at least a filter, a compressor, a cooling medium, a condensation water drain and a residual moisture adsorption bed.

BRIEF EXPLANATION OF THE DRAWINGS

Apparatus for depositing silica on a mandrel and an associated air desiccation line in accordance with the inventive method will now be described by way of example, with reference to the appended drawing in which.

DETAILED DESCRIPTION OF THE PREFERRED EMBODIMENTS

Figure 1:
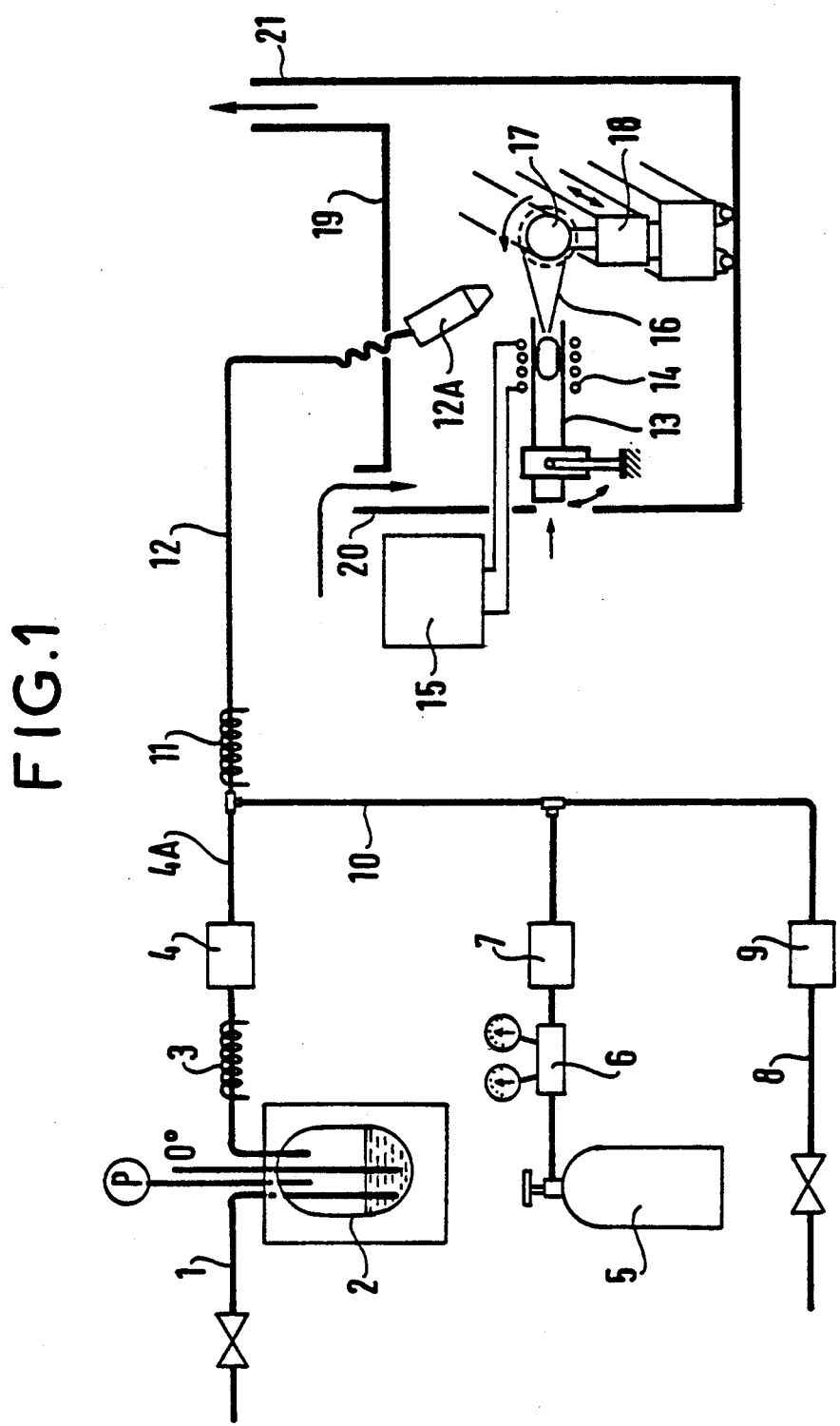
FIG. 1 is a diagram of an apparatus for depositing doped silica onto the entire periphery of a silica mandrel made to rotate about its axis and to move in translation at a right angle to the arrivals of plasma and reagent gases.

As shown in FIG. 1, a piping means 1 is used to introduce silicon tetrachloride into an evaporator 2, kept at a temperature as constant as possible. The vaporized silicon tetrachloride passes through a heater 3, then through a flow controller 4 and a piping means 4A. At the same time, a fluorine-containing gas such as dichlorodifluoromethane, issuing from a bottle 5, flows via a a pressure controller 6 and a flow controller 7 to a piping means 10 joining with the silicon tetrachloride gas feed piping means 4A and likewise a stream of oxygen arriving via a piping means 8 and a flow controller 9. The reagent gases are heated in a heater 11, then flow via the piping means 12 to the injector 12A bringing the reagent gases into contact with the plasma and the mandrel to be coated with a layer of fluorine-doped silica.

Also, a plasmagene gas, such as oxygen, nitrogen or argon, is introduced into a torch 13 the end whereof is surrounded by a coil 14 supplied with high-frequency current by the generator 15. The ionized gas plasma at high temperature forms a jet 16 that impinges on the periphery of the mandrel 17. The latter rotates about its axis and is driven by a rig 18 in smooth translation in a direction perpendicular to the plasma and reagent gas deliveries. The mandrel, the torch and the reagent gases injector are arranged in a closed chamber 19 connected on the one hand to a dry air delivery nozzle 20 and on the other hand to a residual gas discharge pipe 21, connected to an exhaust gases cleaning installation.

Figure 2:
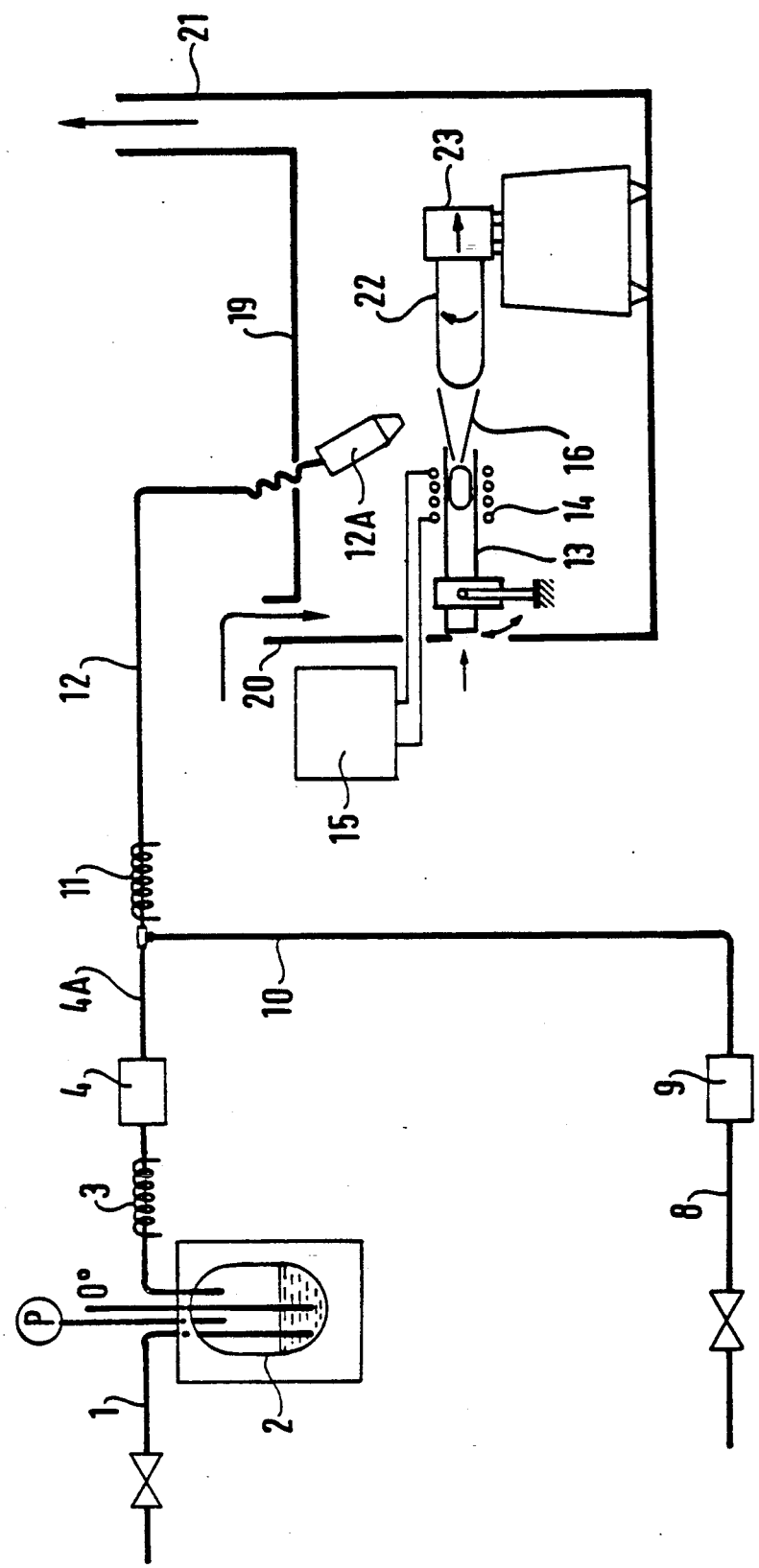
FIG. 2 shows an apparatus for depositing pure silica onto the end of a silica mandrel rotating about its axis and moved in slow translation away from the plasma and reagent gas feeds as the deposit grows.

The apparatus for depositing pure silica onto the end of a mandrel, shown in FIG. 2, is broadly identical to the apparatus of FIG. 1 The supply of silicon tetrachloride from the evaporator 2 is similar. Since the deposit must be pure silica, the only other reagent gas is oxygen, arriving through pipe 8, flow controller 9 and pipe 10.

The reagent gases are heated in heater 11 and then flow via pipe 12 to the injector 12A.

In addition, a plasmagene gas is introduced into the plasma torch 13 surrounding by the coil 14 supplied with high frequency current by generator 15. A jet 16 of very high temperature plasma forms at the outlet of the torch 13 to impinge on the end of the mandrel 12. The latter, rotating about its axis, is driven by its rig 23 in a slow translation taking it gradually away from the torch and the reagent gases injector as the silica is deposited on the end of the mandrel.

As in the previous embodiment, the mandrel, the plasma torch and the injector are all located inside a closed chamber 19, supplied with dry air from the nozzle 20 and discharging the residual gas via a pipe 21 to a treatment installation.

Figure 3:
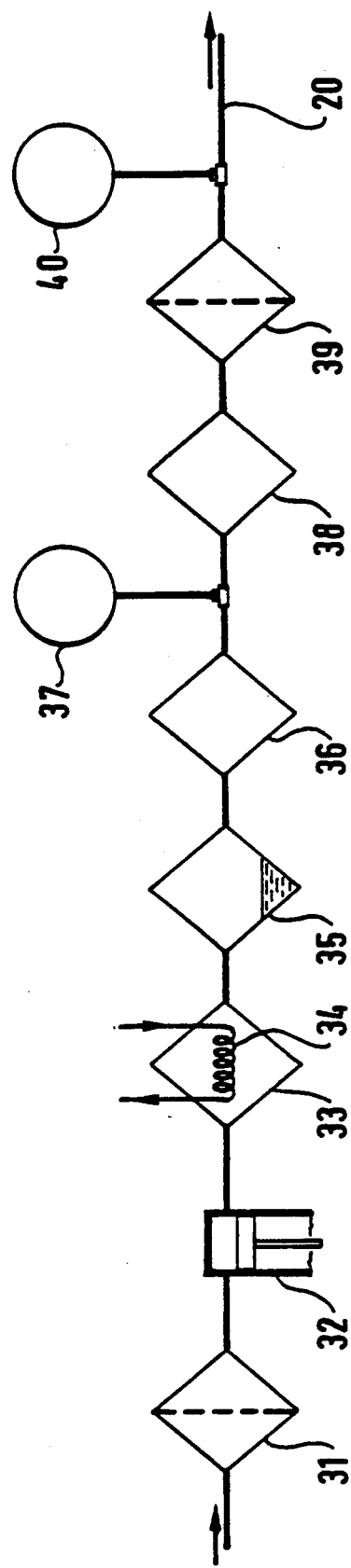
FIG. 3 represents a desiccating line for the air fed into the closed chamber surrounding the mandrel, the plasma torch and the reagent gases injector.

In the air desiccating line represented in FIG. 3, the atmospheric air is given a first cleaning to remove dust, organic vapors (oils) and hydrochloric vapors on an activated carbon filter 31. This air then goes to a compressor 32, then to a water-based cooling means 33, where it is cooled by indirect contact with a cold water pipe coil 34. It next goes to a moisture-eliminating adsorber 36, consisting for example of a zeolite. It is connected downstream from this adsorber to a capacity reservoir 37 and then flows through a final adsorber 38 and a final filter 39 to a supply reservoir 40 feeding dry air through pipe 20 to the nozzle delivering dry air into the closed chamber surrounding the mandrel the plasma torch and the reagents injector.

Such an air processing line allows air with a residual water vapor content not exceeding one part per million by volume to be obtained. The invention accordingly makes it possible to effect silica deposits, either doped or not, with hydroxyl ion concentrations of less than 1 ppm and typically of the order of 0.1 ppm, usable for the manufacture of optical fibers with very low linear attenuation coefficients.

What is claimed is:

1. A method for plasma deposition of substantially hydroxyl ion-free silica onto the outer surface of a silica rod, comprising the steps of providing a sealed enclosure containing a rod, which sealed enclosure is separated from the surrounding atmosphere, reacting in the sealed chamber a silicon compound with oxygen in the presence of a plasma generated by induction with a high frequency generator to deposit silica onto the rod, wherein said enclosure is supplied with atmospheric air which has successively been subjected to filtering, compression and cooling, draining of condensation water and a final desiccation by adsorption.

2. The method of claim 1, wherein the silicon compound is silicon tetrachloride.

3. The method of claim 1, wherein a dopant is introduced into the plasma.

4. The method of claim 3, wherein the dopant is dichlorodifluoromethane.

5. The method of claim 1, wherein the treated atmospheric air supplied to the sealed enclosure has a water vapor content not exceeding one part per million by volume.

6. The method of claim 1, wherein the silica deposited on the rod has a hydroxyl ion content of less than 1 ppm.

7. The method of claim 6, wherein the silica deposited on the rod has a hydroxyl ion content of about 0.1 ppm.

8. The method of claim 1, wherein the silica as deposited onto the rod is pure, undoped silica.

9. A device for plasma deposition of substantially hydroxyl ion-free silica onto the outer surface of a silica rod, by reaction of a silicon compound with oxygen in the presence of a gas plasma generated by induction with a high frequency generator to deposit silica onto the rod, comprising a rod for receiving the silica deposit, a rig imparting rotation and translation to the rod, a torch delivering a plasmagene gas, an induction coil supplied by a high frequency generator around the end of the torch and a nozzle for injection towards the rod a mixture of oxygen and a silicon compound, all of these elements are arranged inside a sealed enclosure separated from the surrounding atmosphere, and wherein said enclosure is supplied with atmospheric air by piping means equipped with at least a filter, a compressor, a cooling medium, a condensation water drain and at least one residual moisture adsorption bed.

* * * * *